Figure 1:
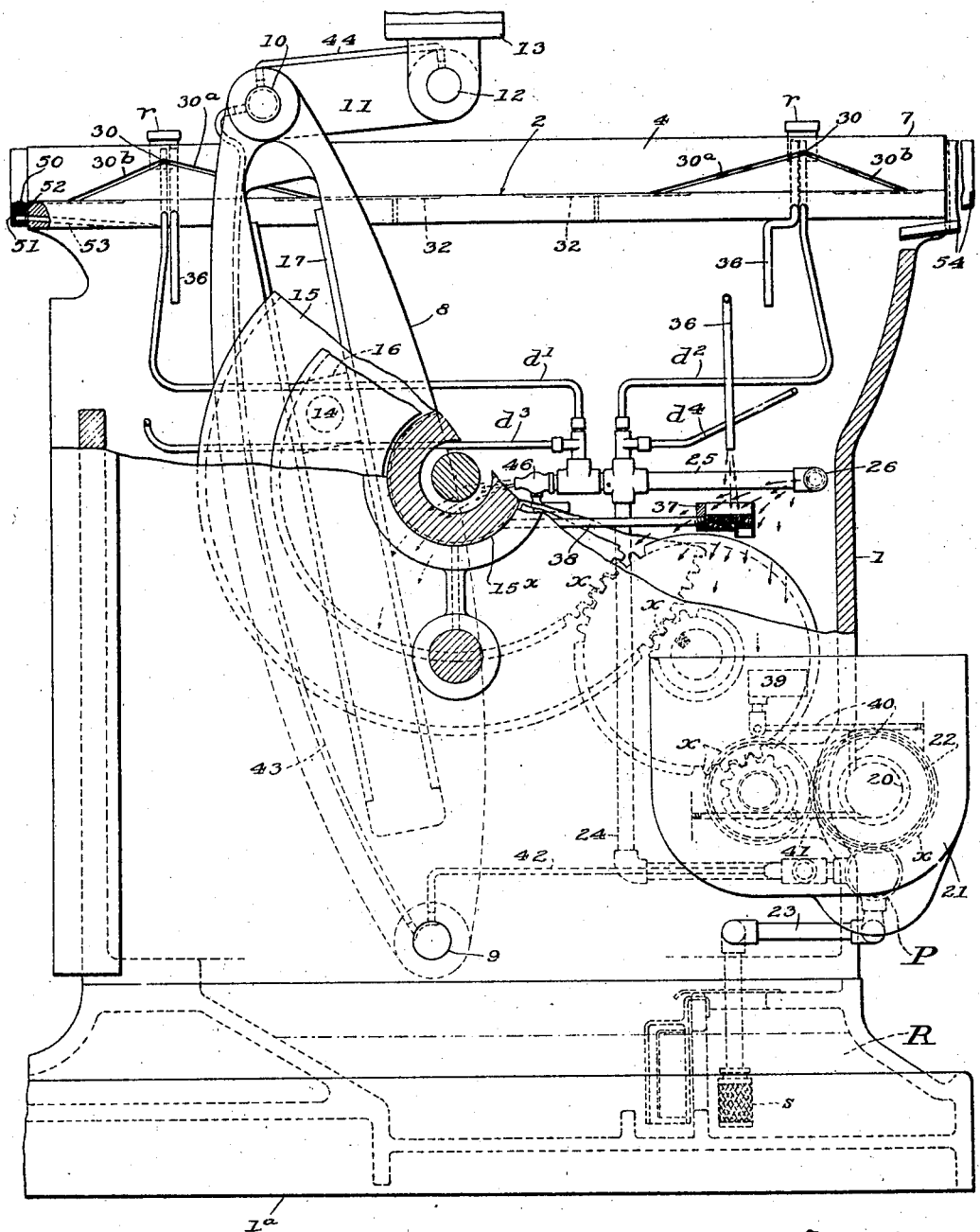

Nov. 11, 1930.  W. F. ZIMMERMANN  1,781,149
OILING SYSTEM FOR SHAPERS
Filed Jan. 24, 1927  2 Sheets-Sheet 1

Inventor
William F. Zimmermann
By Attorney
Albert F. Nathan

Patented Nov. 11, 1930

1,781,149

UNITED STATES PATENT OFFICE

WILLIAM F. ZIMMERMANN, OF MAPLEWOOD, NEW JERSEY, ASSIGNOR TO GOULD & EBERHARDT, OF NEWARK, NEW JERSEY, A CORPORATION OF NEW JERSEY

OILING SYSTEM FOR SHAPERS

Application filed January 24, 1927. Serial No. 163,064.

The degree of efficiency of any machine tool is dependent largely upon the amount of friction resulting from the contact of the relatively movable parts thereof. Likewise the life of the machine is dependent upon the rate of wear caused by that friction. To minimize both friction and wear on contacting surfaces it has long been the practice to provide a film of lubricant between those surfaces, and many different means have been provided for applying the lubricant thereto. It will readily be perceived that should any two contacting surfaces be inadequately lubricated those surfaces will wear rapidly and eventually the entire machine will be put out of commission. Therefore it is essential that every friction surface be adequately lubricated and consequently any improvement in the art of lubrication is of great value and importance.

It has been found wholly impractical to rely on the attendant manually to effect the lubrication of certain machines inasmuch as invariably he will apply too much lubricant at one time and too little at another time and sometimes neglect it entirely with the result that the machine is impaired. Obviously the greater is the area of the bearing surfaces the more important it is that they be kept adequately lubricated. Shaping machines is one type of machine tool having extensive bearing surfaces that have long presented a serious problem with respect to lubrication. These machines include a tool carrying ram reciprocable in guide ways provided by the machine frame and due to the fact that the ram overhangs the machine frame during its cutting stroke, the ram necessarily is a heavy element and the bearing surfaces therefor necessarily are of great area. Certain ones of the systems heretofore employed to effect lubrication of these bearing surfaces comprised a main lubricant reservoir located in the base of the machine frame, a tower-like auxiliary reservoir, of substantial size, supported on the upper portion of the machine frame above the surfaces; means to pump lubricant from the main reservoir up into the auxiliary reservoir; and a plurality of gravity or siphon feed lubricant ducts extending from the auxiliary reservoir to various points on the bearing surfaces. These systems, however, have been found to be not entirely satisfactory among other reasons because of the great difficulty experienced in transporting sufficient lubricant from the auxiliary reservoir to the points farthest removed therefrom, with the result that certain points have not been sufficiently lubricated and wear has resulted.

This invention has for an object to overcome the inherent defects of these prior lubricating systems and to provide an improved system which positively will lubricate adequately all points on the bearing surfaces without over-lubricating any point. This object has been attained by providing auxiliary reservoirs, preferably in the nature of oil cups of small size and capacity, at various points adjacent the surfaces required to be lubricated and positively supplying lubricant individually to each cup from a main reservoir continuously during the operation of the machine. Oil ducts, extending from each individual oil cup to one of the surfaces to be lubricated, transmit lubricant to those surfaces in amounts proportionate to the need.

Another object of the invention is to provide means whereby a predetermined amount of lubricant will be maintained in each individual auxiliary reservoir, and to prevent building up of pressure therein. This has been effected by providing an overflow duct leading from each of the individual reservoirs (at points above the bottoms thereof) back to the main reservoir whereby a continuous flow of lubricant is maintained through each auxiliary reservoir but a predetermined amount is maintained therein for transmission to the bearing surface as may be required.

Still other objects of the invention are to provide, in combination with a positively acting ram lubricating system as above described, improved means for lubricating the pivotal connection of the usual ram-reciprocating lever, the bearing of the lever-oscillating crank-member and the bearing of the continuously rotating prime-mover of the machine and to provide improved means whereby the attendant readily may perceive whether the system is functioning properly.

Other objects and advantages will be in part indicated in the following description and in part rendered apparent therefrom in connection with the annexed drawings.

To enable others skilled in the art so fully to apprehend the underlying features thereof that they may embody the same in the various ways contemplated by this invention, drawings depicting a shaping machine typifying machine tools to which this invention may be applied and, in such drawings, like characters of reference denote corresponding parts throughout all the views, of which:—

Figures 2, 3, 4:
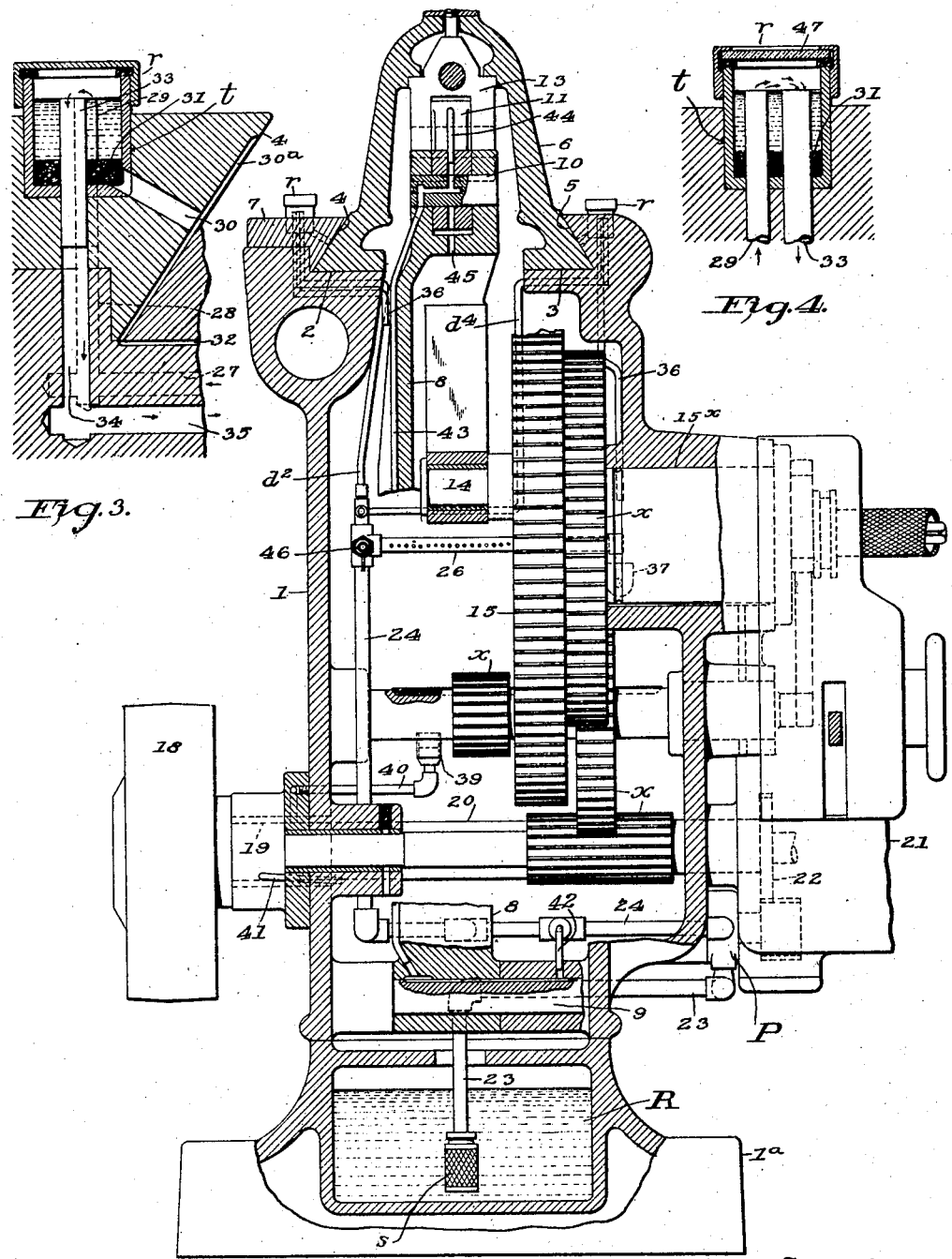

Figure 1 is a side elevation, partly in section of a shaping machine embodying the present invention, the ram being omitted. Fig. 2 is a transverse vertical section through the machine illustrated in Fig. 1. Fig. 3 is a detail sectional view through one of the auxiliary reservoirs showing the delivery conduit to transport the lubricant to the reservoir, the duct to direct a portion of the lubricant to the bearing surface and the overflow conduit to drain a portion of the lubricant back to the main reservoir thereby to maintain a predetermined amount of lubricant in the auxiliary reservoir and to prevent building up of pressure therein. Fig. 4 is a section through another of said auxiliary reservoirs showing a transparent cover thereon, through which the attendant may observe the flow of lubricant from the delivery conduit to the overflow conduit when the lubricating system is functioning properly.

Referring more particularly to the drawings, the invention is disclosed as embodied in a shaping machine comprising a box-like frame 1 providing in its upper portion horizontally disposed bearing surfaces 2 and 3 and inclined bearing surfaces 4 and 5. A tool carrying ram 6 is slidingly supported upon the surfaces 2 and 3 and is held against upward and lateral movement by the surfaces 4 and 5. For convenience of manufacture and assembling the bearing surface 4 may be provided by a wedge strap 7 removably secured upon the upper portion of the machine frame. The ram is adapted to be reciprocated in the direction of its length by oscillation of a lever 8 fulcrumed at its lower end, as at 9, to the machine frame and having its upper end pivoted at 10 to one end of a link 11. The other end of the link is pivoted, at 12, to a block 13 adjustably supported by the ram, as is common in this type of machine tool. Oscillatory movements are given to the lever 8 by a crank-pin 14, adjustably mounted in the usual manner, upon a bull-gear 15 rotatably journaled in a bearing 15ˣ in the main frame, and a slide-block 16 journaled upon said pin and fitted to a slideway 17 extending lengthwise of said lever.

Power to rotate the bull-gear and to oscillate the lever 8, thereby to effect reciprocation of the ram, is provided by a continuously rotating pulley 18 journaled, at 19, in the machine frame. This pulley is adapted to be clutched to a transverse shaft 20 journaled in bearings provided by the main frame. Inasmuch as the means for clutching the pulley 18 (which may be considered a prime-mover) to the shaft 20 is conventional and forms no part of this invention illustration and description thereof is deemed unnecessary. The bull-gear 15 is rotated from the drive-shaft 20 at any one of a plurality of speeds through a system of gearing designated generally as $x$, and includes speed change gearing located within the gear case 21.

The improved lubricating system includes a main lubricant reservoir R formed in the machine frame and preferably in a base section $1^a$ thereof, a pump P adapted to draw lubricant from the reservoir; and a plurality of small auxiliary reservoirs $r$ supported by the machine frame adjacent the bearing surface for the ram. During the operation of the machine the pump is driven continuously from a gear 22 on the drive shaft 20 and draws lubricant from the main reservoir through an intake pipe 23 provided with a strainer $s$. A pipe 24 extends from the exhaust port of the pump upwardly within the machine frame to a point substantially in the horizontal plane of the axis of the bull gear, where it is connected to a branch line 25 coupled with a perforated tube or nozzle 26 which, during the operation of the pump serves to spray lubricant over all of the gearing within the machine frame.

As hereinbefore stated lubricant is positively supplied to each of the auxiliary reservoirs constantly during the operation of the machine. To that end, fluid delivery pipes $d^1$, $d^2$, $d^3$ and $d^4$ are connected with the pipe 24 and each of these pipes connects with one of the auxiliary reservoirs $r$. For convenience of manufacture this connection preferably is made as shown in Figs. 2 and 3 which consists in connecting the upper ends of the delivery pipes with horizontal bores 27, which intersect vertical bores 28, both formed in the upper portion of the machine frame. Short tubes 29 are fitted into the upper ends of the vertical bores 28 and form continuations of the delivery pipes $d^1$, $d^2$, $d^3$ and $d^4$. The auxiliary reservoirs are preferably, but not necessarily, in the form of small oil cups fitted into sockets $t$ drilled into the upper face of the main frame (or into the strap 7 if the same be used) adjacent the ram bearing surfaces 4 and 5. The tubes 29 project through apertures formed in the bottoms of the oil cups whereby each of the cups is permanently connected with the delivery side of the pump and receives a steady flow of lubricant therefrom whenever the machine is in operation. Lubricant is led from the auxiliary reservoirs to the bearing surfaces 4 and 5 by ducts 30 extending from the inside of said reservoirs to said surfaces. These ducts are preferably of substantial size, in cross section, to prevent clogging and a suitable packing is provided to retard the flow of lubricant therethrough. This packing conveniently may consist of a felt washer 31 placed in the bottom of the oil cup and will also serve as a filter for the lubricant. The delivery ends of the ducts 30 connect with oil distributing grooves $30^a$ and $30^b$, formed in the bearing surfaces 4 and 5, which serve to distribute the lubricant lengthwise and transversely of those surfaces. These distributing grooves also connect with similar grooves 32 formed in the horizontal ram supporting bearing surfaces 2 and 3 whereby those surfaces also are lubricated by lubricant passing through the ducts 30.

Adjacent its forward end the frame is provided with felt wipers 50 which contact with the under side of the ram and remove therefrom any surplus amount of oil thereon. Connected cavities 51 and 52 are formed at opposite sides of the wipers and receive the oil removed thereby. These cavities are connected with drains 53 which extend into the machine frame and return to the main reservoir any oil collected by the cavities. At its rear end the frame is fitted with a drip pan 54 which collects any oil that might drip from the ram or its bearing surfaces and returns it to the inside of the frame after which it finds its way back to the main reservoir.

To insure that there will always be an adequate supply of lubricant in the auxiliary reservoirs the system is so regulated that the lubricant will be delivered to those reservoirs at a rate faster than it may flow through the ducts 30. An important feature of this invention is the provision of means to take care of the differential between the rate of supply to and the rate of use from the auxiliary reservoirs. This is effected in a very ingenious yet simple manner by connecting an overflow pipe 33 with each auxiliary reservoir and having its intake end located substantially close to the top of the reservoir. This overflow serves to maintain a constant head of lubricant in the reservoirs, and also serves to prevent the building up of pressure therein, whereby the rate of flow through the ducts 30 will always be the same. It is to be remembered that the lubricant enters the auxiliary reservoirs under pressure from the pump whereas it flows through the overflow pipe only by gravity. Therefore, to insure against the building up of pressure in the reservoirs, it is desirable that the overflow pipes be of larger capacity than the delivery pipes as shown in Fig. 4.

With one exception, later to be referred to, all of the overflow pipes lead back into the machine frame and return the surplus lubricant to the main reservoir. Any suitable connection may be made from each of the overflow pipes 33 to the reservoir but preferably it will consist of vertical and horizontal bores 34 and 35, respectively, and a return pipe 36. The overflow from one of the auxiliary reservoirs is utilized to effect continuous lubrication of the bearing for the bull-gear and therefore the return pipe from that particular overflow empties into an auxiliary reservoir 37 within the main frame and a pipe 38 extends from that reservoir to the bearing $15^x$ of the bull-gear. Suitable packing in the reservoir 37 retards the flow of lubricant through the pipe 38 so that the amount of lubricant supplied to the bearing will be in accordance with the need. This improved lubricating system also effects lubrication of the bearing for the continuously rotating pulley wheel 18 whether or not the machine be in operation. This is effected by the provision of a supplemental reservoir 39, within the machine frame, which reservoir collects lubricant sprayed out by the gear lubricating tube or nozzle 26 and transmits it to the bearing 19 through a conduit 40. This reservoir also is provided with packing to regulate the rate of flow through the delivery conduit. The capacity of the reservoir is sufficient to supply lubricant to the pulley bearing continuously during the periods when the machine is inoperative and when the pump therefore is at rest. A return duct 41 leads the used oil from the bearing 19 back into the machine frame and precludes the dripping of oil from the bearing outside of the frame.

Other important features of this invention are the provision of means to effect forced lubrication of the pivotal connections of the lever 8 and the link 11 and a pressure regulator to control the action of the entire system. To effect forced lubrication of the pivotal connections above referred to, a pipe 42 connects from the pump delivery pipe 24 to the pivot 9 of the lever. A second pipe 43 extends lengthwise of the lever and connects the pivots 9 and 10, and still a third pipe 44 connects the pivots 10 and 12 of the link 11. The pivot pins are provided with suitable oil grooves whereby a free flow of lubricant is permitted from the pump to the pivot 12 from which it drips back to the main reservoir. A duct 45 extends from the pivot 10 through the upper end of the lever 8 and permits lubricant to drip upon the slide block 16 and ways 17. It is to be noted that the pivot 12 is located above the level of the auxiliary reservoirs r and therefore when the pressure in the system is such that lubricant is forced up to that pivot a continuous flow to the auxiliary reservoirs is ensured. Pressure in the system is regulated by the openings and closing of a pet-cock 46 connected with the pump delivery pipe 24. It will readily be perceived that if this cock is closed the entire output of the pump will be forced through the openings in the tube 26, the delivery pipes $d^1$, $d^2$, $d^3$ and $d^4$ and the pipes extending to the pivots 9, 10 and 12, whereas if the cock is completely open a substantial amount of the lubricant displaced by the pump will flow outwardly therefrom and the pressure on the system will be greatly reduced. Thus by manipulating this cock any desired pressure and rate of flow may be secured.

To enable the operator to be advised as to the action of the lubricating system, one of the auxiliary reservoirs $r$ is preferably provided with a transparent top 47 through which the opened ends of the delivery and over-flow pipes may be observed. When the system is functioning properly the lubricant may be seen flowing out of the upper end of the delivery pipe and downwardly through the overflow pipe. The instant the pump stops this flow ceases, therefore this tell-tale device has decided advantages over the common type of sight-feed oilers.

From the foregoing it will be perceived that this invention provides a very simple and efficient means for positively and continuously lubricating all of the bearing surfaces of a shaping machine and that the specific embodiment disclosed has distinct advantages over prior lubricating systems. For example, the small auxiliary reservoirs $r$ are inconspicuous and are not in the way of the operator as are certain tower-like and trombone-like devices heretofore provided for lubricating the ram-ways and ram reciprocating lever connections.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:—

Having thus revealed this invention, I claim as new and desire to secure the following combinations and elements, or equivalents thereof, by Letters Patent of the United States:—

1. In a shaping machine constructed with a closed frame having in its upper portion, and exteriorly thereof, pairs of transversely arranged bearing surfaces forming open-ended channels and a reciprocable ram arranged between and guided by said bearing surfaces, a lubricating system comprising a main lubricant reservoir; a pump adapted to draw lubricant from said reservoir; auxiliary reservoirs of relatively small capacity located exteriorly of said closed frame and adjacent each pair of said bearing surfaces; lubricant ducts connecting said auxiliary reservoirs with said surfaces; a lubricant conduit connecting said pump with each of said auxiliary reservoirs positively and continuously to supply lubricant thereto from said pump; and an overflow drain connected to each of said auxiliary reservoirs to return the excess lubricant to said main reservoir.

2. In a shaping machine constructed with a frame provided at its upper portion with bearing surfaces forming open-ended guide channels and a reciprocable ram slidingly mounted on said bearing surfaces and adapted during reciprocation to have its ends projected beyond the ends of said guide channel, a lubricating system comprising a main lubricant reservoir; an auxiliary reservoir located adjacent each of said guide channels; a lubricant duct connecting each of said auxiliary reservoirs with one of said bearing surfaces; pressure means continuously to convey lubricant from said main reservoir to each of said auxiliary reservoirs; an overflow duct connected with each of said auxiliary reservoirs, and means to regulate the effective action of said pressure means.

3. In a shaping machine constructed with a closed frame provided exteriorly thereof with spaced relatively wide bearing surfaces of substantial length, said bearing surfaces comprising open-ended guide channels, and a reciprocable ram in contact with said surfaces and controlled thereby during its reciprocation; a lubricating system comprising a lubricant reservoir, a pump adapted to draw lubricant from said reservoir; a plurality of auxiliary reservoirs located adjacent to and in the horizontal plane of said bearing surfaces and spaced apart lengthwise thereof; a lubricant duct connecting each of said auxiliary reservoirs with one of said bearing surfaces; and a lubricant conduit connecting said pump with each of said auxiliary reservoirs positively to supply lubricant individually thereto.

4. In a shaping machine constructed with a frame providing bearing surfaces exteriorly of said frame, said bearing surfaces forming open-ended guide channels, and a reciprocable ram located within said channels and guided by said bearing surfaces, said ram being adapted during its reciprocations to have its ends projected beyond the ends of said bearing surfaces, a lubricating system comprising a lubricant reservoir; a plurality of oil cups fitted into sockets formed in the upper surface of said frame along each of said guide channels; means to force oil upwardly from said reservoir into said oil cups; a duct connecting each of said oil cups with one of said bearing surfaces, said ducts being so constructed and arranged as to pass out at a rate substantially slower than it is supplied to said oil cups; and means to return the surplus oil to said reservoir.

5. A shaping machine combining a closed frame providing, at its upper portion and exteriorly thereof, spaced bearing surfaces; a ram slidingly fitted between said surfaces; means, including an oscillatory lever connected with the ram and a gearing system adapted to oscillate the lever, for reciprocating said ram; a lubricant reservoir within said frame below said gearing system; a plurality of oil cups provided by said frame adjacent each of said bearing surfaces; a duct leading from each of said oil cups to one of said bearing surfaces whereby lubricant is supplied to each of said surfaces at a plurality of points; a pump adapted to draw lubricant from said reservoir; a conduit connected with each of said oil cups and receiving lubricant from said pump for direct transmission to the individual oil cups; and a conduit receiving lubricant from said pump and terminating in a spray tube adapted to lubricate said gearing system continuously during the operation of the machine.

6. A shaping machine combining a closed frame providing, exteriorly thereof, bearing surfaces forming open-ended guide channels; a ram slidingly fitted within said guide channels means to reciprocate said ram, said means including a continuously rotating member journaled in said frame, a shaft adapted to be coupled to said member, a lever operatively connected with said ram, a crank mechanism for oscillating the lever and gearing operatively connecting said shaft with said crank mechanism; a main lubricant reservoir; an oil cup located adjacent each of said bearing surfaces; a lubricant duct extending from each of said oil cups to one of said surfaces; means positively to transport lubricant from said reservoir directly to each of said oil cups continuously during the operation of the machine; an auxiliary reservoirs; means to supply lubricant to the last named reservoir from the main reservoir during the operation of the machine; and means slowly to conduct lubricant from said auxiliary reservoir to the bearing for said continuously rotating member while the machine is at rest.

In witness whereof, I have hereunto subscribed my name.

WILLIAM F. ZIMMERMANN.